US012770874B2

(12) United States Patent
Yoshihara et al.

(10) Patent No.: US 12,770,874 B2
(45) Date of Patent: Oct. 20, 2026

(54) POSITIVE ELECTRODE ACTIVE MATERIAL FOR NONAQUEOUS SECONDARY BATTERY, AND METHOD FOR MANUFACTURING SAME

(71) Applicant: NICHIA CORPORATION, Anan (JP)

(72) Inventors: Kumi Yoshihara, Anan (JP); Kosuke Shimokita, Tokushima (JP); Kiyoto Ikebata, Tokushima (JP); Takashi Sugimoto, Tokushima (JP)

(73) Assignee: NICHIA CORPORATION, Anan (JP)

( * ) Notice: Subject to any disclaimer, the term of this patent is extended or adjusted under 35 U.S.C. 154(b) by 504 days.

(21) Appl. No.: 18/495,121

(22) Filed: Oct. 26, 2023

(65) Prior Publication Data

US 2024/0072253 A1 Feb. 29, 2024

Related U.S. Application Data

(62) Division of application No. 16/795,539, filed on Feb. 19, 2020, now Pat. No. 11,837,723.

(30) Foreign Application Priority Data

Feb. 20, 2019 (JP) ................................ 2019-028488
Jan. 28, 2020 (JP) ................................ 2020-011300

(51) Int. Cl.
*H01M 4/525* (2010.01)
*C01G 53/504* (2025.01)
(Continued)

(52) U.S. Cl.
CPC .......... *H01M 4/525* (2013.01); *C01G 53/504* (2025.01); *H01M 4/131* (2013.01);
(Continued)

(58) Field of Classification Search
None
See application file for complete search history.

(56) References Cited

U.S. PATENT DOCUMENTS

2012/0183853 A1 7/2012 Chu et al.
2012/0270107 A1 10/2012 Toya et al.
(Continued)

FOREIGN PATENT DOCUMENTS

CN 107968200 A 4/2018
CN 104409700 B 7/2018
(Continued)

*Primary Examiner* — Scott J. Chmielecki
(74) *Attorney, Agent, or Firm* — Hunton Andrews Kurth LLP

(57) ABSTRACT

Provided is a positive-electrode active material for a non-aqueous electrolyte secondary battery, including a lithium transition metal composite oxide particle having a layered structure and containing nickel, and an oxide containing lithium and aluminum and an oxide containing lithium and boron adhering to a surface of the lithium transition metal composite oxide particle. The lithium transition metal composite oxide particle includes a secondary particle formed by aggregation of primary particles containing a solid solution of aluminum in a surface layer. The lithium transition metal composite oxide particles have a composition with a difference of more than 0.22 mol % and less than 0.6 mol % between a ratio of the number of moles of aluminum in the solid solution in the surface layer of the primary particles relative to a total number of moles of metal other than lithium and a ratio of the number of moles of aluminum present in a region other than the surface layer of the primary particles relative to the total number of moles of metal other than lithium.

12 Claims, 3 Drawing Sheets

(51) Int. Cl.

| | |
|---|---|
| ***H01M 4/02*** | (2006.01) |
| ***H01M 4/131*** | (2010.01) |
| ***H01M 4/1391*** | (2010.01) |
| ***H01M 4/36*** | (2006.01) |
| ***H01M 4/505*** | (2010.01) |
| ***H01M 10/0525*** | (2010.01) |

(52) U.S. Cl.
CPC ......... *H01M 4/1391* (2013.01); *H01M 4/366* (2013.01); *H01M 4/505* (2013.01); *H01M 10/0525* (2013.01); *C01P 2002/52* (2013.01); *C01P 2002/54* (2013.01); *C01P 2004/03* (2013.01); *C01P 2004/45* (2013.01); *C01P 2004/51* (2013.01); *C01P 2004/61* (2013.01); *C01P 2004/62* (2013.01); *C01P 2006/40* (2013.01); *H01M 2004/028* (2013.01); *Y02E 60/10* (2013.01)

(56) References Cited

U.S. PATENT DOCUMENTS

| | | | | |
|---|---|---|---|---|
| 2018/0026268 | A1 | 1/2018 | Kim et al. | |
| 2019/0165362 | A1* | 5/2019 | Baek ..................... | H01M 4/625 |
| 2020/0266441 | A1 | 8/2020 | Yoshihara et al. | |
| 2020/0343552 | A1* | 10/2020 | Kim ..................... | H01M 4/525 |

FOREIGN PATENT DOCUMENTS

| | | | |
|---|---|---|---|
| JP | 2002075367 | A | 3/2002 |
| JP | 2003292322 | A | 10/2003 |
| JP | 2006012433 | A | 1/2006 |
| JP | 2011116580 | A | 6/2011 |
| JP | 2011146390 | A | 7/2011 |
| JP | 2012204036 | A | 10/2012 |
| JP | 2013206553 | A | 10/2013 |
| JP | 2015076336 | A | 4/2015 |
| JP | 2015213038 | A | 11/2015 |
| JP | 2018014326 | A | 1/2018 |
| KR | 20160045029 | A | 4/2016 |
| KR | 20180090211 | A | 8/2018 |

* cited by examiner

POSITIVE ELECTRODE ACTIVE MATERIAL FOR NONAQUEOUS SECONDARY BATTERY, AND METHOD FOR MANUFACTURING SAME

CROSS-REFERENCE TO RELATED APPLICATIONS

This is a divisional application of U.S. patent application Ser. No. 16/795,539, filed Feb. 19, 2020, which claims priority to Japanese Patent Application No. 2019-028488, filed on Feb. 20, 2019, and Japanese Patent Application No. 2020-011300, filed on Jan. 28, 2020, the disclosures of which are hereby incorporated by reference in their entirety.

BACKGROUND

Field of the Invention

The present disclosure relates to a positive-electrode active material for a nonaqueous electrolyte secondary battery and a method for manufacturing the same.

Description of the Related Art

A lithium transition metal composite oxide having a layered structure such as lithium cobaltate and lithium nickelate serving as a positive-electrode active material for a nonaqueous electrolyte secondary battery has a high working voltage of about 4 V and a large capacity. It is therefore widely used as power sources for electronic devices, such as portable telephone, notebook computers, and digital cameras, and in-vehicle batteries. As electronic devices and in-vehicle batteries are enhanced in functionality, a positive-electrode active material for a nonaqueous electrolyte secondary battery exhibiting favorable cycle characteristics in a higher voltage region is being developed.

For example, Japanese Laid-Open Patent Publication No. 2015-76336 describes a positive-electrode active material for a nonaqueous electrolyte secondary battery including secondary particles formed by aggregation of a plurality of primary particles, and it is described that the material has favorable charge/discharge cycle characteristics at high voltage. In the positive-electrode active material for a nonaqueous electrolyte secondary battery described in the patent document, an oxide containing lithium, aluminum, and boron is formed on the surface of the secondary particles, and aluminum is contained in a grain boundary between the primary particles present near the surface of the secondary particles at a higher concentration than a matrix phase of the primary particles.

SUMMARY

A first aspect provides a positive-electrode active material for a nonaqueous electrolyte secondary battery. The positive-electrode active material includes lithium transition metal composite oxide particles having a layered structure and containing nickel, and an oxide containing lithium and aluminum and an oxide containing lithium and boron adhering to a surface of the lithium transition metal composite oxide particles. The lithium transition metal composite oxide particles include secondary particles formed by aggregation of primary particles containing a solid solution of aluminum in a surface layer. The lithium transition metal composite oxide particles have a composition with a difference of more than 0.22 mol % and less than 0.6 mol % between a ratio of the number of moles of aluminum in the solid solution in the surface layer of the primary particles relative to the total number of moles of metal other than lithium in the lithium transition metal composite oxide particle and a ratio of the number of moles of aluminum present in a region other than the surface layer of the primary particles relative to the total number of moles of metal other than lithium in the lithium transition metal composite oxide particle.

A second aspect provides a method for manufacturing a positive-electrode active material for a nonaqueous electrolyte secondary battery. The method includes providing a mixture containing lithium transition metal composite oxide particles having a layered structure and containing nickel, a lithium compound, an aluminum compound, and a boron compound; and heat-treating the provided mixture. The lithium transition metal composite oxide particles include secondary particles formed by aggregation of primary particles. The aluminum compound has a volume-based particle diameter distribution in which a total volume percentage of particles having a particle diameter of 0.4 μm to 3.0 μm is greater than 54%.

DETAILED DESCRIPTION

Figure 1A:
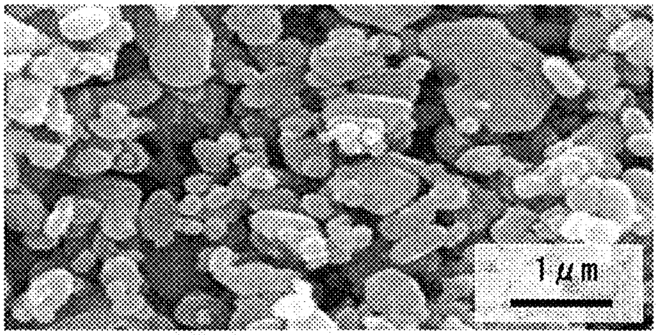
FIG. 1A is a scanning electron microscope (SEM) image of aluminum oxide used in Example 1.

The term “step” as used herein includes not only an independent step but also a step not clearly distinguishable from another step as long as the intended purpose of the step is achieved. If multiple substances correspond to a component in a composition, the content of the component in the composition means the total amount of the multiple substances present in the composition unless otherwise specified. Embodiments of the present invention will now be described in detail. It is noted that the embodiments described below are exemplification of a positive-electrode active material for a nonaqueous secondary battery and a method for manufacturing the same for embodying the technical ideas of the present invention, and the present invention is not limited to the positive-electrode active material for a nonaqueous secondary battery and the method for manufacturing the same etc. described below.

Positive-Electrode Active Material for Nonaqueous Electrolyte Secondary Battery

In the positive-electrode active material for a nonaqueous electrolyte secondary battery described in the patent document, a relatively large amount of an aluminum compound must be added so as to further improve charge/discharge cycle characteristics at high voltage. This causes a problem of reduction in charge/discharge capacities. The present disclosure may provide a positive-electrode active material for a nonaqueous electrolyte secondary battery capable of constituting a nonaqueous electrolyte secondary battery alleviating a capacity reduction due to an additive and having favorable cycle characteristics at high voltage.

A positive-electrode active material for a nonaqueous electrolyte secondary battery, hereinafter, also simply referred to as "positive-electrode active material", includes lithium transition metal composite oxide particles having a layered structure and containing nickel, and oxides adhering to the surface of the lithium transition metal composite oxide particles. The oxides include an oxide containing lithium and aluminum and an oxide containing lithium and boron. The lithium transition metal composite oxide particles include secondary particles formed by aggregation of primary particles containing a solid solution of aluminum in a surface layer. The lithium transition metal composite oxide particles have a composition with a difference of more than 0.22 mol % and less than 0.6 mol % between a ratio of the number of moles of aluminum in the solid solution in the surface layer of the primary particles relative to the total number of moles of metal other than lithium and a ratio of the number of moles of aluminum present in a region other than the surface layer of the primary particles relative to the total number of moles of metal other than lithium.

When a nonaqueous electrolyte secondary battery is formed by using the positive-electrode active material in which the oxide containing lithium and aluminum and the oxide containing lithium and boron adhere to the surface of the secondary particles formed from the primary particles containing a solid solution of aluminum in the surface layer, the battery can exhibit excellent cycle characteristics. For example, this can be considered as follows. In the secondary particles formed by aggregation of a plurality of the primary particles, it is considered that deterioration occurs from a crystal structure of the surface layer of the primary particles during a charge/discharge cycle. In this regard, it is conceivable that structural deterioration can be suppressed by forming the solid solution of aluminum in the primary particle surface layer. Additionally, hydrofluoric acid may be generated under high voltage conditions, which may cause elution of a constituent component of the primary particle surface layer, resulting in a reduction in the effect of the solid solution of aluminum in the primary particle surface layer in some cases. However, it is considered that the oxide containing lithium and aluminum and the oxide containing lithium and boron adhering to the secondary particle surface can suppress the influence of the hydrofluoric acid and allow the aluminum in the solid solution in the primary particle surface layer to sufficiently exhibit the effect thereof so as to achieve excellent cycle characteristics. Nickel contained in the lithium transition metal composite oxide is easily reduced when having a high valence. Therefore, the lithium transition metal composite oxide containing nickel is considered as having a crystal structure easily collapsing due to repetition of the cycle. This embodiment is considered to be therefore particularly effective for stabilizing the structure of the lithium transition metal composite oxide containing nickel.

The primary particles have a layered structure and are configured to include the lithium transition metal composite oxide containing nickel (hereinafter, also simply referred to as "lithium transition metal composite oxide"). The lithium transition metal composite oxide may contain at least lithium (Li), nickel (Ni), and aluminum (Al) in the liquid solution in the surface layer, and may further contain at least one of cobalt (Co) and manganese (Mn). Additionally, the lithium transition metal composite oxide may further contain at least one first metal element selected from the group consisting of zirconium (Zr), titanium (Ti), magnesium (Mg), tantalum (Ta), niobium (Nb), and molybdenum (Mo). The lithium transition metal composite oxide may contain aluminum as the first metal element in addition to aluminum in the solid solution in the primary particle surface layer. That is, the first metal element may be at least one selected from the group consisting of aluminum (Al), zirconium (Zr), titanium (Ti), magnesium (Mg), tantalum (Ta), niobium (Nb), and molybdenum (Mo).

The molar ratio of nickel to the total number of moles of metal other than lithium in the lithium transition metal composite oxide may be, for example, 0.33 or more, preferably 0.4 or more, more preferably 0.55 or more. The upper limit of the molar ratio of nickel relative to the total number of moles of metal other than lithium may be, for example, less than 1, preferably 0.95 or less, more preferably 0.8 or less, and further preferably 0.6 or less. When the molar ratio of nickel is within the range described above, both charge/discharge capacities and cycle characteristics may be achieved at high voltage in the nonaqueous electrolyte secondary battery.

When the lithium transition metal composite oxide contains cobalt, the molar ratio of cobalt to the total number of moles of metal other than lithium may be, for example, 0.02 or more, preferably 0.05 or more, more preferably 0.1 or more, further preferably 0.15 or more. The upper limit of the molar ratio of cobalt relative to the total number of moles of metal other than lithium may be, for example, less than 1, preferably 0.33 or less, more preferably 0.3 or less, further preferably 0.25 or less. When the molar ratio of cobalt is within in the range of 0.02 or more and less than 1, sufficient charge/discharge capacities may be achieved at high voltage in the nonaqueous electrolyte secondary battery.

When the lithium transition metal composite oxide contains manganese, the molar ratio of manganese to the total number of moles of metal other than lithium may be, for example, 0.01 or more, preferably 0.05 or more, more preferably 0.1 or more, further preferably 0.15 or more. The upper limit of the molar ratio of manganese relative to the total number of moles of metal other than lithium may be, for example, 0.33 or less, preferably 0.3 or less, more preferably 0.25 or less. When the content ratio of manganese is within the range of 0.01 or more and 0.33 or less, both charge/discharge capacities and safety may be achieved in the nonaqueous electrolyte secondary battery.

When the lithium transition metal composite oxide contains the first metal element, the molar ratio of the first metal element to the total number of moles of metal other than lithium may be, for example, 0.001 or more, preferably 0.002 or more. The upper limit of the molar ratio of the first metal element relative to the total number of moles of metal other than lithium may be, for example, 0.02 or less, preferably 0.015 or less.

In the lithium transition metal composite oxide, the molar ratio of lithium to the total number of moles of metal other than lithium may be, for example, 1.0 or more, preferably 1.03 or more, and more preferably 1.05 or more. The upper limit of the molar ratio of lithium relative to the total number of moles of metal other than lithium may be, for example, 1.5 or less, preferably 1.25 or less.

When the lithium transition metal composite oxide contains cobalt and manganese in addition to nickel, the molar ratio of nickel, cobalt, and manganese may be, for example, nickel:cobalt:manganese=(0.33 to 0.95):(0.02 to 0.33):(0.01 to 0.33), preferably (0.55 to 0.6):(0.15 to 0.25):(0.15 to 0.3).

The lithium transition metal composite oxide including aluminum in the solid solution may have a composition represented by, for example, Formula (1) or (1a) below:

$$Li_aNi_{1-x-y}Co_xMn_yAl_zM^1{}_wO_2 \quad (1)$$

wherein $1.0 \le a \le 1.5$, $0.02 \le x \le 0.34$, $0.01 \le y \le 0.34$, $0.002 \le z \le 0.05$, $0 \le w \le 0.02$, and $0.05 \le x+y \le 0.67$, and $M^f$ is at least one selected from the group consisting of Zr, Ti, Mg, Ta, Nb, and Mo. $0.0022 \le z \le 0.05$, $0.0022 \le z \le 0.006$, $0.003 \le z \le 0.005$, or $0.0035 \le z \le 0.0045$ may be satisfied. Additionally, $0.02 \le x \le 0.33$, $0.01 \le y \le 0.33$, and $0.05 \le x+y \le 0.66$ may be satisfied.

$$Li_aNi_bCo_cMn_dAl_eM^1{}_fO_2 \quad (1a)$$

wherein 1.0≤aS1.5, $0.33 \le b \le 0.95$, $0.02 \le c \le 0.33$, $0.01 \le d \le 0.33$, $0.0022 \le e \le 0.05$, $0 \le f \le 0.02$, and $b+c+d=1$, and $M^f$ is at least one selected from the group consisting of Zr, Ti, Mg, Ta, Nb, and Mo.

The surface layer of the primary particle constituting the lithium transition metal composite oxide particle contains a solid solution of aluminum. The surface layer in this case means a region having a depth of 100 nm, preferably 70 nm, from the surface of the primary particle. The particle diameter of the primary particle is measured as an equivalent circle diameter of an area of the primary particle calculated from a contour recognized by observation with a scanning electron microscope (SEM), for example. The average particle diameter of the primary particles may be, for example, 0.3 μm to 2.0 μm, preferably 0.6 μm to 1.5 μm. The average particle diameter of the primary particles is calculated as an arithmetic average value of particle diameters of 100 primary particles measured by SEM observation, for example.

A state of the solid solution of aluminum in the surface layer of the primary particles can be observed by energy dispersive X-ray analysis (EDX). For example, an aluminum content in the surface layer of the primary particles can be measured by analyzing a composition of constituent elements at a crystal grain boundary that is a contact portion between the primary particles in a cross section of the secondary particle. If the aluminum content at the crystal grain boundary is sufficiently larger than the aluminum content near a central portion of the primary particle, it can be considered that the solid solution of aluminum is contained in the surface layer of the primary particles. The solid solution of aluminum may be contained entirely or partially in an interface between the primary particles.

An amount of the solid solution of aluminum in the surface layer of the primary particles may be within a range of difference of, for example, 0.2 mol % to less than 0.6 mol %, preferably 0.3 mol % to 0.5 mol %, more preferably 0.35 mol % to 0.45 mol %, between a ratio of the number of moles of aluminum in the solid solution in the surface layer of the primary particles relative to the total number of moles of metal other than lithium and a ratio of the number of moles of aluminum present in a region other than the surface layer of the primary particles relative to the total number of moles of metal other than lithium. The amount of the solid solution of aluminum may be, for example, more than 0.22 mol % and less than 0.6 mol %, may be 0.25 mol % or more, 0.3 mol % or more, or 0.35 mol % ore more, and may be 0.5 mol % or less, or 0.45 mol % or less. Aluminum present in a region other than the surface layer of the primary particles may include aluminum contained in a lithium transition metal composite oxide which forms a base material having no aluminum solid solution in the surface.

The aluminum solid solution amount in the surface layer of the primary particles can be measured by utilizing the fact that aluminum is an amphoteric element as follows. The amount is measured by quantifying the aluminum content with an inductively coupled plasma (ICP) emission spectrometer after washing and removing oxides containing lithium and aluminum adhering to the surface of the positive-electrode active material with an alkaline aqueous solution such as a sodium hydroxide aqueous solution. When the lithium transition metal composite oxide serving as a base material has a composition containing aluminum, i.e., when aluminum is contained in a region other than the surface layer of the primary particles, the aluminum solid solution amount in the surface layer of the primary particles can be calculated by subtracting the aluminum content in the composition of the lithium transition metal composite oxide serving as the base material.

The secondary particles are lithium transition metal composite oxide particles and are formed as aggregates of primary particles. The average particle diameter of the secondary particles may be, for example, 2 μm to 25 μm, preferably 3 μm to 17 μm. The average particle diameter of the secondary particles is measured as a particle diameter at which a volume integrated value from the small particle diameter side is 50% in a volume-based particle diameter distribution obtained by a laser scattering method.

The oxide containing lithium and aluminum and the oxide containing lithium and boron adhere to the surface of the secondary particle. The oxide containing lithium and aluminum and the oxide containing lithium and boron may adhere on at least part of the surface region of the secondary particle.

In the positive-electrode active material, the content of the oxide containing lithium and aluminum relative to the lithium transition metal composite oxide particles may be, for example, 0.1 mol % to 0.8 mol %, preferably 0.13 mol % or more, more preferably 0.15 mol % or more, and preferably 0.5 mol % or less, more preferably 0.25 mol % or less, in terms of aluminum relative to the total number of moles of metal other than lithium. The content of the oxide containing lithium and aluminum within the range of 0.1 mol % to 0.8 mol % tends to further improve the cycle characteristics at high voltage while suppressing a reduction in charge/discharge capacities.

The oxide containing lithium and aluminum and adhering on the surface of the lithium transition metal complex oxide particles has a volume-based particle diameter distribution in which a total volume percentage of particles having a particle diameter of 0.4 μm to 3.0 μm may be, for example greater than 50%, preferably 70% or more, or 90% or more. The total volume percentage is a cumulative volume ratio of particles having diameter of 0.4 μm to 3.0 μm relative to the total volume of the oxide particles containing lithium and aluminum.

In the positive-electrode active material, the content of the oxide containing lithium and boron relative to the lithium transition metal composite oxide particles may be, for example, 0.3 mol % to 2.0 mol %, preferably 0.4 mol %, more preferably 0.45 mol % or more, and preferably 1.0 mol % or less, more preferably 0.6 mol % or less, in terms of boron relative to the total number of moles of metal other than lithium. It is considered that the role of boron is to carry aluminum into the secondary particles through the grain boundaries between the primary particles, for example. Therefore, the content of the oxide containing lithium and boron relative to the lithium transition metal composite oxide particles within the range tends to further improve the cycle characteristics at high voltage while suppressing a reduction in charge/discharge capacities.

The total of the aluminum solid solution amount, the adhesion amount of the oxide containing lithium and aluminum, and the adhesion amount of the oxide containing lithium and boron in the positive-electrode active material may be, for example, 3.4 mol % or less, preferably 2.0 mol % or less and, for example, 0.6 mol % or more, preferably 0.83 mol % or more, in terms of aluminum or boron relative to the total number of moles of metal other than lithium.

In the positive-electrode active material, a content ratio (Al/B) of the oxide containing lithium and aluminum to the oxide containing lithium and boron may be, for example, 0.05 to 2.7, preferably 0.5 to 2.0, more preferably 0.8 to 1.5 in terms of aluminum and boron. The content ratio may be 0.1 or more, 0.2 or more, or 0.3 or more and may be 1 or less, 0.8 or less, or 0.6 or less. The content ratio within the range tends to further improve the cycle characteristics at high voltage while suppressing a reduction in charge/discharge capacities.

In the positive-electrode active material, an aluminum solid solution percentage (%), i.e., a percentage of the aluminum solid solution amount in the surface layer of the primary particle relative to the total aluminum content, may be, for example, 40% to less than 100%, preferably 50% to 90%, more preferably 60% to 80%. The aluminum solid solution percentage within the range tends to further improve the cycle characteristics at high voltage while suppressing a reduction in charge/discharge capacities. Here, the total aluminum content in the positive-electrode active material is defined by sum of the aluminum content of the oxide containing lithium and aluminum and adhering on the surface of the secondary particle, and the aluminum content of the solid solution in the surface of the primary particles. The total aluminum content in the positive-electrode active material may be measured by using an inductively coupled plasma (ICP) emission spectrometer.

In the positive-electrode active material, an aluminum coat percentage (%), i.e., a percentage of the aluminum content of the oxide containing lithium and aluminum and adhered on the surface of the secondary particles relative to the total aluminum content, may be, for example, greater than 0% and 60% or less, preferably 10% to 50%, more preferably 20% to 40%. The aluminum coating percentage within the range tends to further improve the cycle characteristics at high voltage while suppressing a reduction in charge/discharge capacities.

Method for Manufacturing Positive-Electrode Active Material for Nonaqueous Electrolyte Secondary Battery A method for manufacturing a positive-electrode active material for a nonaqueous electrolyte secondary battery includes a preparation step of preparing a mixture containing lithium transition metal composite oxide particles having a layered structure and containing nickel, a lithium compound, an aluminum compound, and a boron compound, and a heat treatment step of heat-treating the prepared mixture. The lithium transition metal composite oxide particles include secondary particles formed by aggregation of primary particles. The aluminum compound used has a volume-based particle diameter distribution in which a percentage of particles having a particle diameter of 0.4 μm to 3.0 μm is greater than 54%. The method for manufacturing a positive-electrode active material for a nonaqueous electrolyte secondary battery is a manufacturing method enabling efficient manufacturing of the positive-electrode active material described above.

The heat treatment following the addition of the aluminum compound to the lithium transition metal composite oxide particles comprising the secondary particles formed by aggregation of the primary particles allows the aluminum to diffuse from the secondary particle surface through the grain boundary into the secondary particle. In this case, using the aluminum compound having a certain particle diameter distribution enables efficient manufacturing of the positive-electrode active material having an aluminum-containing oxide adhering to the surface of the secondary particle while allowing the surface layer of the primary particle to contain a solid solution of aluminum, with a small additive amount. The nonaqueous electrolyte secondary battery formed by using the obtained positive-electrode active material can achieve favorable charge/discharge cycle characteristics at high voltage. This may be attributable to the fact that an amount of aluminum diffusing into the secondary particles becomes larger when the particle diameter of the aluminum compound is smaller, for example.

At the preparation step, a mixture containing lithium transition metal composite oxide particles having a layered structure and containing nickel, a lithium compound, an aluminum compound, and a boron compound is prepared. The preparation step may contain a base material preparation step of preparing lithium transition metal composite oxide particles serving as a base material and a mixing step of mixing the lithium transition metal composite oxide particles, the lithium compound, the aluminum compound, and the boron compound to obtain the mixture.

At the base material preparation step, the lithium transition metal composite oxide particles having a layered structure and containing nickel are prepared. The lithium transition metal composite oxide particles serving as a base material may appropriately be selected from commercially available products or may be obtained by preparing a composite oxide having a desired composition and performing a heat treatment of the oxide together with a lithium compound to prepare a lithium transition metal composite oxide.

A method for obtaining a composite oxide having a desired composition may be a method comprising mixing raw material compounds (hydroxide, a carbonic acid compound, etc.) according to an intended composition and decomposing the compounds into a composite oxide through heat treatment, a coprecipitation method comprising dissolving solvent-soluble raw material compounds in a solvent, achieving precipitation of precursors according to an intended composition through temperature adjustment, pH adjustment, addition of a complexing agent, etc., and heat-treating the precursors to obtain a composite oxide, etc. An example of a method for manufacturing a base material will hereinafter be described.

A method for obtaining a composite oxide with a coprecipitation method can include a seed generation step of obtaining seed crystals by adjusting a pH etc. of a mixed aqueous solution containing metal ions in a desired configuration, a crystallization step of growing the generated seed crystals to obtain a composite hydroxide having desired characteristics, and a step of obtaining a composite oxide through heat treatment of the obtained composite hydroxide. For details of the method for obtaining a composite oxide, reference can be made to Japanese Laid-Open Patent Publication Nos. 2003-292322 and 2011-116580 corresponding to US 2012/0270107 A1 etc.

At the seed generation step, a liquid medium containing seed crystals may be prepared by adjusting a pH of a mixed solution containing nickel ions in a desired configuration to 11 to 13, for example. The seed crystals may contain a nickel hydroxide, for example. The mixed solution may be prepared by dissolving nickel salt as well as manganese salt and cobalt salt contained as necessary in water at a desired ratio. Examples of the nickel salt, the manganese salt, and the cobalt salt may include sulfate, nitrate, and hydrochloride. In addition to the nickel salt, the manganese salt, and the cobalt salt, the mixed solution may contain other metal salts as necessary. The temperature in a reaction vessel at the seed generation step may be 40° C. to 80° C., for example. The atmosphere at the seed generation step may be a low oxidation atmosphere, and the oxygen concentration may be preferably maintained at 10 vol % or less, for example.

At the crystallization step, the generated seed crystals are grown to obtain a precipitate containing nickel having desired characteristics. For example, the seed crystals may be grown by adding a mixed solution containing nickel ions to a liquid medium containing the seed crystals while maintaining the pH at, for example, 7 to 12.5, preferably 7.5 to 12. The addition time of the mixed solution may be, for example, 1 hour to 24 hours, preferably 3 hours to 18 hours. The temperature at the crystallization step may be 40° C. to 80° C., for example. The atmosphere at the crystallization step may be the same as the seed generation step.

The pH may be adjusted at the seed generation step and the crystallization step by using an acidic aqueous solution such as a sulfuric acid aqueous solution and a nitric acid aqueous solution, an alkaline aqueous solution such as a sodium hydroxide aqueous solution and ammonia water, etc.

At the step of obtaining a composite oxide, the composite hydroxide obtained at the crystallization step is heat-treated to obtain a composite oxide. The heat treatment may be performed, for example, by heating at a temperature of 500° C. or less, preferably by heating at 350° C. or less. The temperature of the heat treatment may be, for example, 100° C. or more, preferably 200° C. or more. The duration of the heat treatment may be, for example, 0.5 hours to 48 hours, preferably 5 hours to 24 hours. The atmosphere of the heat treatment may be the air or an atmosphere containing oxygen. The heat treatment can be performed by using a box furnace, a rotary kiln furnace, a pusher furnace, or a roller hearth kiln furnace, for example.

Subsequently, a mixture containing lithium (hereinafter also referred to as lithium mixture) obtained by mixing the obtained composite oxide and the lithium compound may be heat-treated at a temperature of 550° C. to 1000° C. to obtain a heat-treated material. The obtained heat-treated material has a layered structure and contains a lithium transition metal oxide containing nickel.

Examples of the lithium compound mixed with the composite oxide include lithium hydroxide, lithium carbonate, and lithium oxide. The particle diameter of the lithium compound used for the mixing may be, for example, 0.1 μm to 100 μm, preferably 2 μm to 20 μm in terms of a 50% particle diameter of the cumulative particle diameter distribution based on volume.

The ratio of the total number of moles of lithium to the total number of moles of the metal elements constituting the composite oxide in the lithium mixture may be, for example, 1 to 1.5, preferably 1.03 to 1.25. The composite oxide and the lithium compound may be mixed by using a high-speed shear mixer, for example.

The lithium mixture may further contain metal other than lithium, nickel, manganese, and cobalt. Examples of the other metal include Al, Zr, Ti, Mg, Ta, Nb, and Mo, and is preferably at least one selected from the group consisting thereof. When the lithium mixture contains the other metal, the mixture may be obtained by mixing a simple substance or a metal compound of the other metal with the composite oxide and the lithium compound. Examples of the metal compound containing the other metal include oxide, hydroxide, chloride, nitride, carbonate, sulfate, nitrate, acetate, and oxalate.

When the lithium mixture contains the other metal, the ratio between the total number of moles of the metal elements constituting the composite oxide to the total number of moles of the other metal nay be, for example, 1:0.001 to 1:0.02, preferably 1:0.002 to 1:0.015.

The heat treatment temperature of the lithium mixture may be preferably 600° C. to 1000° C., for example. The lithium mixture may be heat-treated at a single temperature or may be heat-treated multiple times at a heat treatment temperature lower than the highest temperature before the heat treatment at the highest temperature so as to suppress particle growth due to sintering and maintain a desired particle shape. The duration of the heat treatment may be, for example, 0.5 hours to 48 hours, and when the heat treatment is performed at multiple temperatures, the duration may be 0.2 hours to 47 hours at each temperature.

The atmosphere of the heat treatment may be the air or an atmosphere containing oxygen. The heat treatment may be performed by using a box furnace, a rotary kiln furnace, a pusher furnace, or a roller hearth kiln furnace, for example.

In the lithium transition metal composite oxide serving as the base material, the ratio of the number of moles of nickel to the total number of moles of metal other than lithium may be, for example, 0.33 or more, preferably 0.4 or more, more preferably 0.55 or more, and the upper limit may be, for example, less than 1, preferably 0.95 or less, more preferably 0.8 or less, further preferably 0.6 or less.

When the lithium transition metal composite oxide serving as the base material contains cobalt, the ratio of the number of moles of cobalt to the total number of moles of metal other than lithium may be, for example, 0.02 or more, preferably 0.05 or more, more preferably 0.1 or more, further preferably 0.15 or more, and the upper limit may be, for example, less than 1, preferably 0.33 or less, more preferably 0.3 or less, further preferably 0.25 or less.

When the lithium transition metal composite oxide serving as the base material contains manganese, the ratio of the number of moles of manganese to the total number of moles of metal other than lithium may be, for example, 0.01 or more, preferably 0.05 or more, more preferably 0.1 or more, further preferably 0.15 or more, and the upper limit may be, for example, 0.33 or less, preferably 0.3 or less, more preferably 0.25 or less.

When the lithium transition metal composite oxide serving as the base material contains cobalt and manganese in addition to nickel, the molar ratio of nickel, cobalt, and manganese may be, for example, nickel:cobalt:manganese=(0.33 to 0.95):(0.02 to 0.33):(0.01 to 0.33), preferably (0.55 to 0.6):(0.15 to 0.25):(0.15 to 0.3).

The lithium transition metal composite oxide serving as the base material may have a composition represented by, for example, Formula (2) or (2a) below:

$$Li_aNi_{1-x-y}Co_xMn_yAl_vM^1_wO_2 \quad (2)$$

wherein $1.0 \leq a \leq 1.5$, $0.02 \leq x \leq 0.34$, $0.01 \leq y \leq 0.34$, $0 \leq v \leq 0.048$, $0 \leq w \leq 0.02$, $0.05 \leq x+y \leq 0.67$, and $M^1$ is at least one selected from the group consisting of Zr, Ti, Mg, Ta, Nb, and Mo. Here, x may be 0.33 or less, y may be 0.33 or less, and x+y may be 0.66 or less.

$$Li_aNi_pCo_qMn_rM^1_sO_2 \quad (2a)$$

wherein $1.0 \leq a \leq 1.5$, $0.33 \leq p \leq 0.95$, $0.02 \leq q \leq 0.33$, $0.01 \leq r \leq 0.33$, $0 \leq s \leq 0.02$, $p+q+r=1$, and $M^1$ is at least one selected from the group consisting of Al, Zr, Ti, Mg, Ta, Nb, and Mo.

The volume average particle diameter of the base material may be, for example, 2 μm to 25 μm, preferably 3 μm to 17 μm.

At the mixing step, the lithium transition metal composite oxide particles serving as the base material, the lithium compound, the aluminum compound, and the boron compound are mixed to obtain a mixture. A method of the mixing may be, for example, dry mixing using a high-speed shear mixer etc.

Examples of the lithium compound include lithium hydroxide, lithium carbonate, and lithium nitrate. The volume average particle diameter of the lithium compound may be, for example, from 0.1 μm to 100 μm, and preferably from 1 μm to 50 μm. The mixing ratio of the lithium compound to the lithium transition metal composite oxide particles in the mixture may be, for example, 1.2 mol % to 7.4 mol %, preferably 1.45 mol % to 4 mol %, in terms of lithium. The mixing ratio in terms of lithium may be 1.6 mol % or more, 1.8 mol % or more, or 2 mol % or more, and may be 3 mol % or less, 2.6 mol % or less, or 2.4 mol % or less.

Examples of the aluminum compound include aluminum oxide and aluminum hydroxide. The aluminum compound used has a volume-based particle diameter distribution in which a total volume percentage of particles having a particle diameter of 0.4 μm to 3.0 μm may be, for example, greater than 54%, or has the particle diameter distribution in which the total volume percentage may be preferably 80% or more, more preferably 90% or more. The total volume percentage in this case is a volume cumulative value of particles having a particle diameter of 0.4 μm to 3.0 μm in the particle diameter distribution. The particle diameter distribution of the aluminum compound within the range tends to further improve the cycle characteristics at high voltage while suppressing a reduction in charge/discharge capacities. The mixing ratio of the aluminum compound to the lithium transition metal composite oxide particles in the mixture may be, for example, 0.1 mol % to 0.8 mol %, preferably 0.13 mol % to 0.5 mol %, in terms of aluminum. The mixing ratio in terms of aluminum may be 0.2 mol % or more, 0.4 mol % or more, or 0.5 mol % or more, and may be 1.2 mol % or less, 1 mol % or less, or 0.7 mol % or less.

Examples of the boron compound include boric acid (orthoboric acid) and boron oxide. The volume average particle diameter of the boron compound may be, for example, from 0.1 μm to 100 μm, preferably from 1 μm to 50 μm. The mixing ratio of the boron compound to the lithium transition metal composite oxide particles in the mixture is, for example, 0.3 mol % to 2 mol %, preferably 0.4 mol % to 1 mol %, in terms of boron. The mixing ratio in terms of boron may be 0.8 mol % or less, or 0.6 mol % or less.

At the heat treatment step, the prepared mixture is heat-treated to obtain a positive-electrode active material for a nonaqueous electrolyte secondary battery as a heat-treated material. The temperature of the heat treatment may be, for example, 500° C. to 800° C., preferably 550° C. or more, more preferably 600° C. or more, and preferably 750° C. or less. The heat treatment may be performed by putting the prepared mixture into a predetermined temperature environment or by raising the temperature of the prepared mixture from, for example, a normal temperature to a predetermined temperature and maintaining the temperature for a predetermined time. When the heat treatment is performed by raising the temperature, the rate of temperature rise may be 1° C./min to 20° C./min, for example. The duration of the heat treatment may be, for example, 2 hours to 40 hours, preferably 5 hours to 20 hours.

The atmosphere of the heat treatment may be the air or an atmosphere containing oxygen. The heat treatment may be performed by using a box furnace, a rotary kiln furnace, a pusher furnace, or a roller hearth kiln furnace, for example.

The oxide containing lithium and aluminum adhering to the lithium transition metal composite oxide particle surface after the heat treatment preferably has a volume-based particle diameter distribution in which a total volume percentage of particles having a particle diameter of 0.4 μm to 3.0 μm is greater than 50%. When the particle diameter distribution of the oxide containing lithium and aluminum is within the range, the elution of the constituent component of the primary particle surface layer due to hydrofluoric acid etc. can be suppressed, and the effect of the solid solution of aluminum in the primary particle surface layer is sufficiently exhibited, so that excellent cycle characteristics can be achieved.

In the method for manufacturing the positive-electrode active material, the heat-treated material obtained after the heat treatment may be subjected to a crushing treatment. A dispersion treatment, a classification treatment, etc. may further be performed.

Positive Electrode for Nonaqueous Electrolyte Secondary Battery

A positive electrode for a nonaqueous electrolyte secondary battery includes a collector and a positive-electrode active material layer disposed on the collector and containing the positive-electrode active material for a nonaqueous electrolyte secondary battery described above. A nonaqueous electrolyte secondary battery comprising this positive electrode is excellent in charge/discharge cycle characteristics at high voltage.

Examples of the material of the collector include aluminum, nickel, and stainless steel. The positive-electrode active material layer can be formed by applying onto the collector a positive electrode mixture obtained by mixing the positive-electrode active material, a conductive material, a binder, etc. together with a solvent, and then performing a drying treatment, a pressure treatment, etc. Examples of the conductive material include natural graphite, artificial graphite, and acetylene black. Examples of the binder include polyvinylidene fluoride, polytetrafluoroethylene, and polyamide acrylic resin.

Nonaqueous Electrolyte Secondary Battery

The nonaqueous electrolyte secondary battery includes the positive electrode for a nonaqueous electrolyte secondary battery. The nonaqueous electrolyte secondary battery includes a negative electrode for a nonaqueous electrolyte secondary battery, a nonaqueous electrolyte, a separator, etc., in addition to the positive electrode for a nonaqueous electrolyte secondary battery. The negative electrode, the nonaqueous electrolyte, the separator, etc. appropriately selectable and usable in the nonaqueous electrolyte secondary battery are described in Japanese Laid-Open Patent Publication Nos. 2002-075367, 2011-146390, 2006-12433, for example.

EXAMPLES

The present invention will hereinafter specifically be described with examples; however, the present invention is not limited to these examples. The volume average particle diameter of the lithium transition metal composite oxide particles is a value at which a volume integrated value from the small particle diameter side is 50% in a volume-based particle diameter distribution obtained by a laser scattering method. Specifically, the volume average particle diameter was measured by using a laser diffraction particle diameter distribution device (MALVERN Inst. MASTERSIZER 2000).

Example 1

Pure water is prepared in a stirred state in a reaction tank, and respective aqueous solutions of nickel sulfate, cobalt sulfate, and manganese sulfate were dropped at a flow ratio at which the molar ratio of nickel, cobalt, and manganese was Ni:Co:Mn=6:2:2. After completion of the dropping, the liquid temperature was set to 50° C., and a predetermined amount of a sodium hydroxide aqueous solution was dropped to obtain a precipitate of a nickel cobalt manganese composite hydroxide. The obtained precipitate was washed with water, filtered, and separated, and lithium carbonate and zirconium (IV) oxide were mixed to achieve Li:(Ni+Co+Mn):Zr=1.02:1:0.005 (molar ratio) to obtain a raw material mixture. The obtained raw material mixture was fired at 840° C. for 12 hours in an air atmosphere to obtain a sintered body. The obtained sintered body was pulverized and passed through a dry sieve to obtain lithium transition metal composite oxide particles serving as the base material represented by a composition formula $Li_{1.07}Ni_{0.6}Co_{0.2}Mn_{0.2}Zr_{0.005}O_2$. The volume average particle diameter of the obtained lithium transition metal composite oxide particles serving as the base material was 11 μm.

The lithium transition metal composite oxide obtained as described above, lithium hydroxide used as the lithium compound, aluminum oxide used as the aluminum compound, and boric acid (orthoboric acid, $H_3BO_3$) used as the boron compound were mixed by a high-speed shear mixer to obtain a mixture such that a proportion of each element of lithium:aluminum:boron was 2.1 mol %: 0.6 mol %: 0.5 mol % relative to the lithium transition metal composite oxide. The volume average particle diameter of the aluminum oxide used as the aluminum compound was 1.1 μm. The obtained mixture was fired in atmospheric air at 700° C. for 10 hours to obtain a positive-electrode active material E1 of Example 1.

Figure 2:
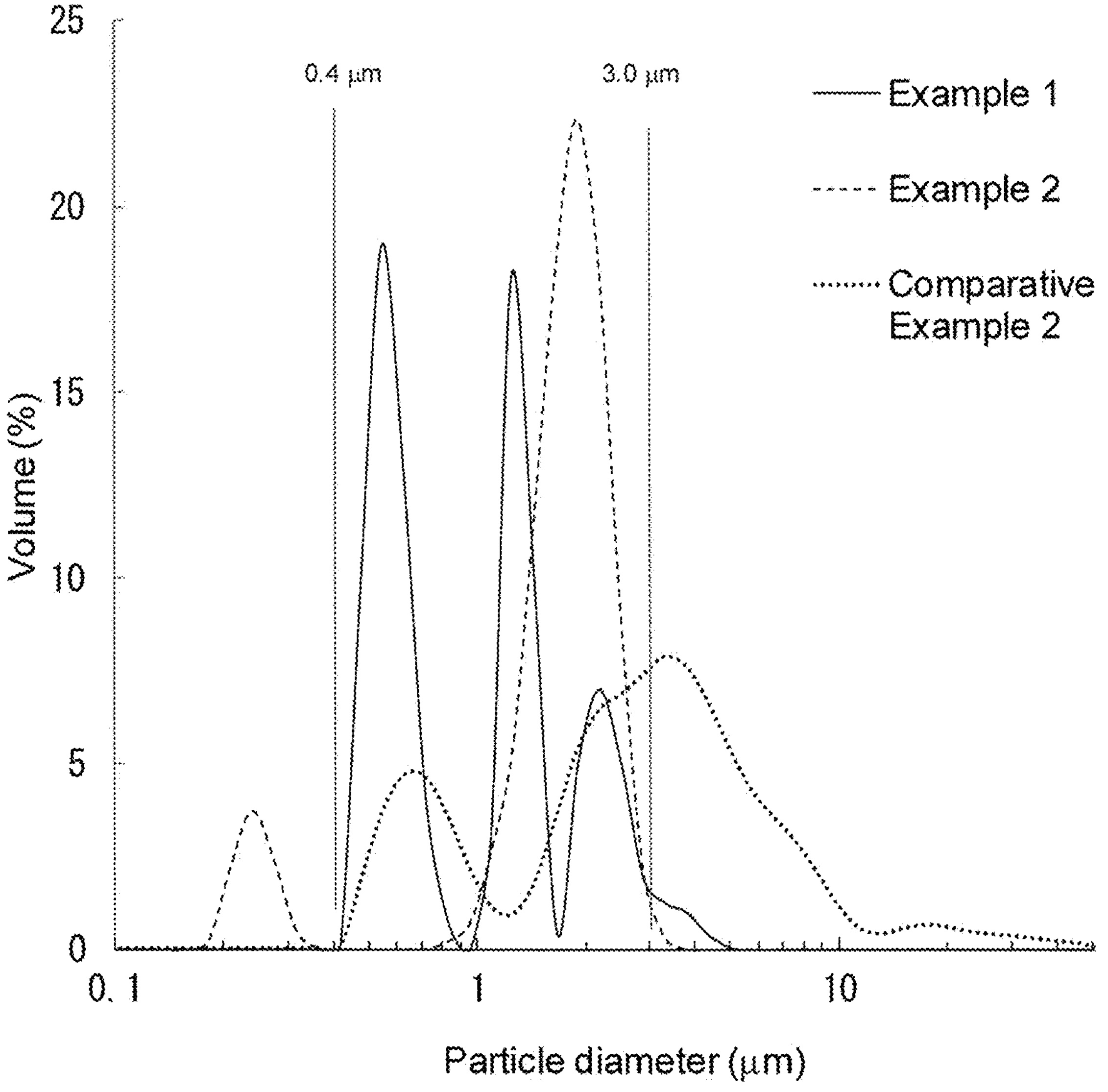
FIG. 2 is a particle diameter distribution of aluminum compounds used in Examples 1, 2 and Comparative Example 2.

The aluminum compound used in Example 1 had the volume-based particle diameter distribution in which the total volume percentage of particles having a particle diameter of 0.4 μm to 3.0 μm was 97%. An SEM image and the particle diameter distribution of the aluminum compound used in Example 1 are shown in FIGS. 1A and 2, respectively.

Example 2

A positive-electrode active material E2 of Example 2 was obtained as in Example 1 except that aluminum hydroxide was used as the aluminum compound. The volume average particle diameter of the aluminum hydroxide was 1.7 μm.

Figure 1B:
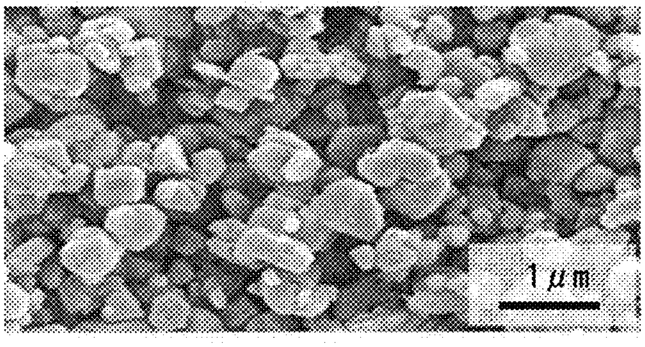
FIG. 1B is an SEM image of aluminum hydroxide used in Example 2.

The aluminum compound used in Example 2 had the volume-based particle diameter distribution in which the total volume percentage of particles having a particle diameter of 0.4 μm to 3.0 μm was 91%. An SEM image and the particle diameter distribution of the aluminum compound used in Example 2 are shown in FIGS. 1B and 2, respectively.

Comparative Example 1

A positive-electrode active material C1 of Comparative Example 1 was obtained as in Example 1 except that aluminum oxide having a volume average particle diameter of 40 nm was used as the aluminum compound.

Figure 1C:
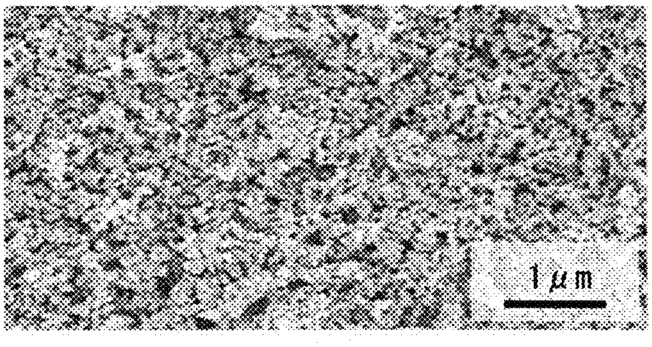
FIG. 1C is an SEM image of aluminum oxide used in Comparative Example 1.

The aluminum compound used in Comparative Example 1 had the volume-based particle diameter distribution in which the total volume percentage of particles having a particle diameter of 0.4 μm to 3.0 μm was 0%. An SEM image of the aluminum compound used in Comparative Example 1 is shown in FIG. 1C.

Comparative Example 2

A positive-electrode active material C2 of Comparative Example 2 was obtained as in Example 1 except that aluminum oxide having a volume average particle diameter of 2.9 μm was used as the aluminum compound.

Figure 1D:
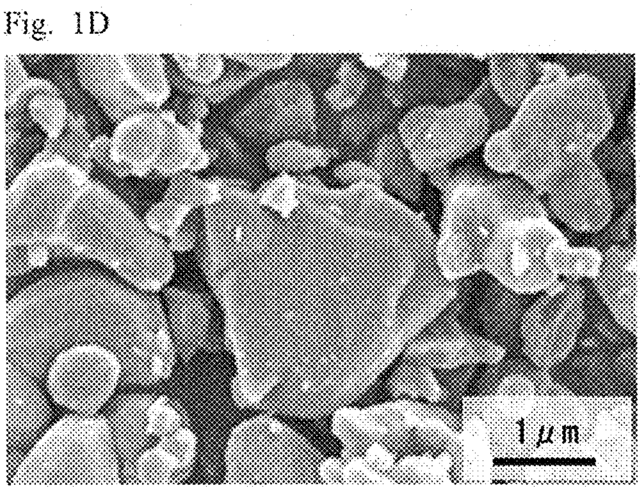
FIG. 1D is an SEM image of aluminum oxide used in Comparative Example 2.

The aluminum compound used in Example 2 had the volume-based particle diameter distribution in which the total volume percentage of particles having a particle diameter of 0.4 μm to 3.0 μm was 54%. An SEM image and the particle diameter distribution of the aluminum compound used in Comparative Example 2 are shown in FIGS. 1D and 2, respectively.

Comparative Example 3

The lithium transition metal composite oxide particles serving as the base material obtained in Example 1 were used as a positive-electrode active material C3 of Comparative Example 3.

≤Aluminum Solid Solution Amount Evaluation>

A method for measuring an amount of a solid solution of aluminum contained in the positive-electrode active material will hereinafter be described. This method utilizes the fact that aluminum is an amphoteric element, and the aluminum containing compound adhering to the positive-electrode active material surface is eluted by sodium hydroxide so as to calculate aluminum remaining in the positive-electrode active material as a solid solution of aluminum. The eluted aluminum compound may include $LiAlO_2$, $Li_2AlBO_4$, $Li_3Al_2BO_6$, etc.

The positive-electrode active material was mixed at a proportion of 3 wt % relative to a 25 wt % sodium hydroxide solution and was stirred for 1 hour and allowed to stand for 15 minutes to precipitate the positive-electrode active material. A supernatant solution was removed so that the proportion of the positive-electrode active material was 33 wt %. Pure water was added and mixed so that the proportion of the positive-electrode active material was 5 wt %. The positive-electrode active material was precipitate by allowing to stand for 15 minutes, and a supernatant solution was removed so that the proportion of the positive-electrode active material was 33 wt %. After repeating the operations of adding/mixing pure water and removing the supernatant solution three times, the positive-electrode active material and the solvent were separated by filtration. The filtered positive-electrode active material was dried in a dryer at 150° C. for 2 hours. The content of aluminum in the obtained positive-electrode active material was quantified by using an inductively coupled plasma (ICP) emission spectrometer. An obtained analysis value corresponds to the content of aluminum of the solid solution in the positive-electrode active material. The aluminum solid solution amount was calculated based on the total content of metal other than lithium and aluminum of 100 mol %. Therefore, the amount was calculated based on (Ni+Co+Mn+Zr):Al=100:aluminum solid solution amount (mol %). Additionally, an aluminum solid solution percentage (%) was calculated as a percentage of the aluminum content after washing relative to the aluminum content before washing. Therefore, the aluminum solid solution percentage is the content after washing/the content before washing (%). The results are shown in Table 1.

≤Surface Compound Evaluation>

A method for confirming the oxide containing lithium and aluminum and the oxide containing lithium and boron adhering to a positive-electrode active material surface will hereinafter be described below. In this method, sodium hydroxide used in the measurement in the aluminum solid solution amount evaluation described above is changed to pure water so as to elute the oxide containing lithium and boron is eluted without eluting the oxide containing lithium and aluminum. The oxide containing lithium and boron may include $LiBO_2$, $Li_3BO_3$, etc.

By performing a heat treatment for a mixture containing the lithium transition metal composite oxide particles, the lithium compound, the aluminum compound, and the boron compound, the added aluminum and boron react with lithium to form an oxide, and portions thereof form a solid solution. A method for evaluating an amount in this solid solution is the aluminum solid solution amount evaluation described above. The aluminum eluted in this evaluation forms an oxide with lithium or an oxide with lithium and boron. Therefore, eluting the oxide of lithium and boron with pure water enables estimation of which element the aluminum reacted with.

The positive-electrode active material was mixed at a proportion of 3 wt % relative to pure water and was stirred for 1 hour and allowed to stand for 15 minutes to precipitate the positive-electrode active material. A supernatant solution was removed so that the proportion of the positive-electrode active material was 33 wt %. Pure water was added and mixed so that the proportion of the positive-electrode active material was 5 wt %. The positive-electrode active material was precipitate by allowing to stand for 15 minutes, and a supernatant solution was removed so that the proportion of the positive-electrode active material was 33 wt %. After repeating the operations of adding/mixing pure water and removing the supernatant solution three times, the positive-electrode active material and the solvent were separated by filtration. The filtered positive-electrode active material was dried in a dryer at 150° C. for 2 hours. The contents of aluminum and boron in the obtained positive-electrode active material were quantified by using an inductively coupled plasma (ICP) emission spectrometer. The measured aluminum solid solution amount can be used in addition to the obtained analysis value so as to estimate a Li—Al coat adhering as the oxide of lithium and aluminum and a Li—B coat adhering as the oxide of lithium and boron.

According to estimation from above results with the results of the solid solution amount of Example 1 in Table 1, the added boron is all eluted by washing with pure water, while almost all of the aluminum is not eluted. From these result, almost all of the eluted boron is considered as forming the oxide of lithium and boron, for example, $LiBO_2$, $Li_3BO_3$, etc. It is also considered that almost all of the aluminum oxide adhering to the surface forms the oxide containing lithium and aluminum, for example $LiAlO_2$, etc.

≤Fabrication of Evaluation Battery>

By using the positive-electrode active materials of Examples 1, 2 and Comparative Examples 1 to 3, nonaqueous electrolyte secondary batteries for evaluation were fabricated in the following manner.

[Fabrication of Positive Electrode]

A positive electrode slurry was obtained by dispersing 85 parts by mass of the positive-electrode active material, 10 parts by mass of acetylene black, and 5 parts by mass of polyvinylidene fluoride in N-methylpyrrolidone. The obtained positive electrode slurry was applied to a collector made of aluminum foil, dried, compression-molded by a roll press, and cut into a predetermined size to obtain a positive electrode.

[Fabrication of Negative Electrode]

A negative electrode slurry was obtained by dispersing 97.5 parts by mass of artificial graphite, 1.5 parts by mass of carboxymethyl cellulose, and 1.0 part by mass of styrene butadiene rubber in water. The obtained negative electrode slurry was applied to a collector made of copper foil, dried, compression-molded by a roll press, and cut into a predetermined size to obtain a negative electrode.

[Fabrication of Nonaqueous Electrolytic Solution]

Ethyl carbonate and methyl ethyl carbonate were mixed at a volume ratio of 3:7 to obtain a mixed solvent. Lithium hexafluorophosphate was dissolved in the obtained mixed solvent to the concentration of 1.0 mol % to obtain a nonaqueous electrolytic solution.

[Assembly of Nonaqueous Electrolyte Secondary Battery]

After respective lead electrodes were attached to the collectors of the positive and negative electrodes, vacuum drying was performed at 120° C. A separator made of porous polyethylene was then arranged between the positive and negative electrodes, and the separator and the electrodes were placed in a bag-shaped laminate pack. After the placement, the water adsorbed in the members was removed by vacuum drying at 60° C. After the vacuum drying, the nonaqueous electrolytic solution was injected into the laminate pack and sealed to obtain a laminate-type nonaqueous electrolyte secondary battery as an evaluation battery. The obtained evaluation battery was used for the following evaluation of battery characteristics.

≤Evaluation of Charge/Discharge Capacities>

Constant-current constant-voltage charge was performed at a charge voltage of 4.25 V and a charge current of 0.2 C (1 C is a current value at which discharge can be completed in 1 hour from a fully charged state) to measure a charge capacity. Subsequently, constant-current discharge was performed at a discharge voltage of 2.75 V and a discharge current of 0.2 C to measure a discharge capacity. By using the charge/discharge capacities of Comparative Example 3 as a reference (100%), a specific charge capacity and a specific discharge capacity were calculated as Qc (%) and Qd (%), respectively. The results are shown in Table 1.

≤Evaluation of Charge/Discharge Cycle Characteristics>

A weak current was applied to the obtained evaluation battery for aging so that the electrolyte was sufficiently applied to the positive electrode and the negative electrode. The evaluation battery is placed in a constant temperature chamber at 45° C. and repeatedly charged and discharged in cycles each comprising charging at a charge potential of 4.4 V and a charge current of 2.0 C (1 C is defined as a current completing discharge in 1 hour) and discharging at a discharge potential of 2.75 V and a discharge current of 2.0 C. A value (%) obtained by dividing a discharge capacity at a 200th cycle by a discharge capacity at a first cycle was defined as a discharge capacity maintenance rate (QsR (%)) at the 200th cycle. The results are shown in Table 1. A high discharge capacity maintenance rate means good cycle characteristics.

TABLE 1

| | aluminum compound | | aluminum solid solution | aluminum solid solution | aluminum coat | cycle characteristics | | |
|---|---|---|---|---|---|---|---|---|
| | type | additive rate (mol %) | amount (mol %) | percentage (%) | percentage (%) | Qc (%) | Qd (%) | QsR (%) |
| Example 1 | $Al_2O_3$ | 0.60 | 0.41 | 68 | 32 | 99 | 99 | 67 |
| Example 2 | $Al(OH)_3$ | | 0.41 | 68 | 32 | 99 | 99 | 63 |
| Comparative Example 1 | $Al_2O_3$ | | 0.60 | 100 | 0 | 100 | 99 | 33 |
| Comparative Example 2 | — | — | 0.22 | 37 | 63 | 99 | 100 | 32 |
| Comparative Example 3 | — | — | — | — | — | 100 | 100 | 1 |

In Examples 1, 2, regardless of whether the added aluminum compound is an oxide or a hydroxide, the addition of the aluminum compound having the same level of particle diameter distribution alleviates the reduction in capacity and improves the cycle characteristics at high voltage. It is considered that the adjustment of the particle diameter distribution of the added aluminum compound results in a form allowing coexistence of the solid solution of aluminum contained in the surface layer of the primary particles and the oxide containing lithium and aluminum coating the surface of the secondary particles, which effectively suppresses the deterioration of the positive-electrode active material with a small additive amount. Even when the same amount of aluminum oxide is added as in Comparative Examples 1, 2, the cycle characteristics deteriorate in both cases when the volume average particle diameter is small (Comparative Example 1) and when the total volume percentage or particles having a particle diameter of 0.4 μm to 3.0 μm is small in the volume-based particle diameter distribution (Comparative Example 2).

≤Evaluation of Aluminum Distribution by EDX>

Figure 3:
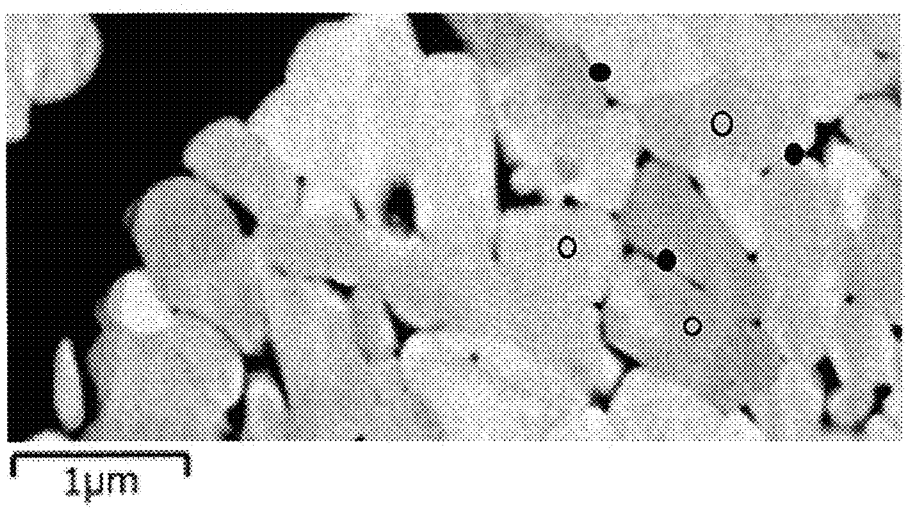
FIG. 3 is a diagram showing measurement positions of elemental analysis in a reflection electron microscope image of a cross section of a positive-electrode active material of Example 1.
Figure 4:
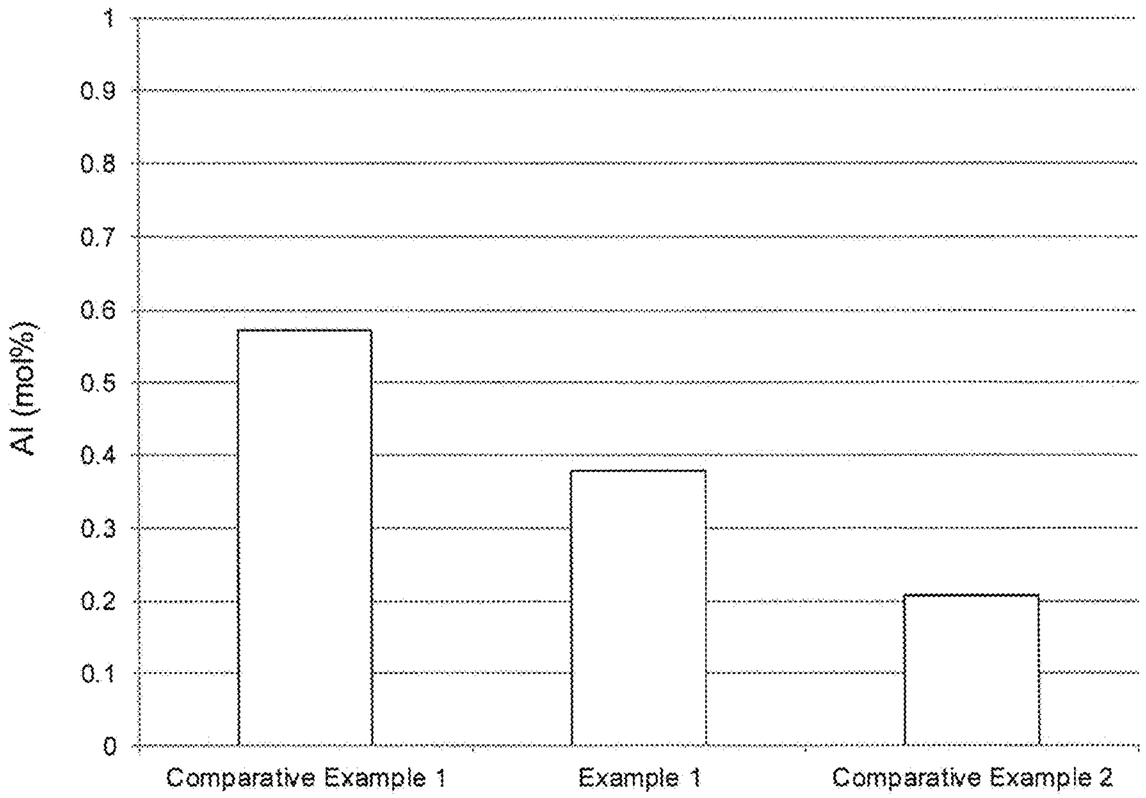
FIG. 4 is a diagram showing a result of elemental analysis in a surface layer of primary particles of the positive-electrode active materials of Example 1, Comparative Example 1 and Comparative Example 2.

Elemental analysis using energy dispersive X-ray analysis (EDX) was performed as a method for evaluating the distribution of aluminum in the surface layer of the primary particles. Specifically, the measurement was performed by using a field emission scanning electron microscope (FE-SEM) (Hitachi High-Technologies, SU8230). Measurement conditions include an acceleration voltage of 5 kV, EC=25 μA, and an analysis time of 30 s. Measurement locations are positions as shown in FIG. 3, which is a cross-sectional view of the secondary particles of Example 1, and measurement was performed at a black circle indicative of a surface layer portion of the primary particles and a white circle indicative of an internal portion of the primary particles. FIG. 4 shows a measurement result of the aluminum solid solution amount in the surface layer portion of the primary particles. The measurement result of the surface layer portion is an average value of values obtained by measuring 15 locations per particle for three secondary particles. The internal portion of the primary particles was measured at 5 locations per particle. The aluminum solid solution amount is shown in mol % when the total amount of nickel, cobalt and manganese is 100 mol %.

As shown in FIG. 4, aluminum was detected in the surface layer portion of the primary particles. On the other hand, aluminum was not detected in the inner portion of the primary particles. Similar results were obtained in Example 2, Comparative Example 1, and Comparative Example 2. This indicates that aluminum is not diffused inside the primary particles and exists only in the surface layer of the primary particles. As shown in Comparative Example 1 and Example 1 of FIG. 4, when the particle diameter of the aluminum compound was smaller, the amount of aluminum present in the surface layer of the primary particles was larger.

≤Measurement of Particle Diameter of Oxide Containing Lithium and Aluminum after Heat Treatment>

Figure 5:
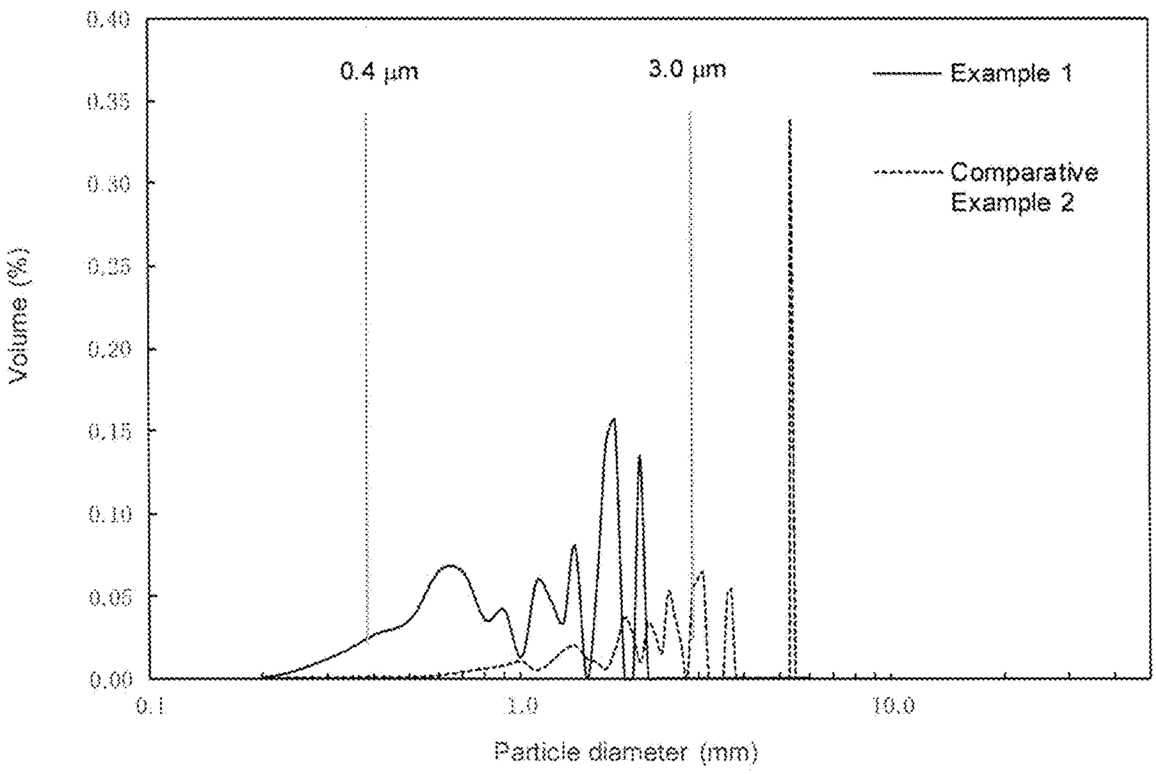
FIG. 5 is a particle diameter distribution of an oxide containing aluminum adhering to the surface of the positive-electrode active material obtained in Example 1 and Comparative Example 2.

For particle diameter evaluation of the oxide containing lithium and aluminum adhering to the particle surface, measurement was performed by combining energy dispersive X-ray analysis (EDX) and a field emission scanning electron microscope (FE-SEM). Images taken at random by FE-SEM were used for confirming the oxide containing lithium and aluminum with EDX. For particles of the confirmed oxide containing lithium and aluminum, an area of the primary particles was calculated from a contour recognized by observation with FE-SEM, and the particle diameter was measured as the equivalent circle diameter of the area. The measured oxide containing lithium and aluminum was evaluated by calculating the particle diameter of 100 or more particles. The results are shown in FIG. 5. As described above, the oxide containing lithium and aluminum adhering to the surface of the positive-electrode active material obtained in Example 1 had the volume-based particle diameter distribution in which the total volume percentage of particles having a particle diameter of 0.4 μm to 3.0 μm was 99%. On the other hand, the oxide containing lithium and aluminum adhering to the surface of the positive-electrode active material obtained in Comparative Example 2 had the volume-based particle diameter distribution in which the total volume percentage of particles having a particle diameter of 0.4 μm to 3.0 μm was 49%.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A method for manufacturing a positive-electrode active material for a nonaqueous electrolyte secondary battery comprising:

providing a mixture containing a lithium transition metal composite oxide particle having a layered structure and containing nickel, a lithium compound, an aluminum compound, and a boron compound; and heat-treating the provided mixture to adhere an oxide containing lithium and aluminum and an oxide containing lithium and boron on the surface of the lithium transition metal composite oxide particle, respectively, wherein the lithium transition metal composite oxide particle comprises a secondary particle formed by aggregation of primary particles, and wherein the aluminum compound has a volume-based particle diameter distribution in which a total volume percentage of particles having a particle diameter of 0.4 μm to 3.0 μm is greater than 54%.

2. The method according to claim 1, wherein a temperature of the heat treatment is 500° C. to 800° C.

3. The method according to claim 1, wherein the lithium transition metal composite oxide particle has a composition in which a ratio of a number of moles of nickel to a total number of moles of metal other than lithium is 0.33 or more and 0.95 or less.

4. The method according to claim 1, wherein the lithium transition metal composite oxide particle has a composition comprising cobalt, and wherein a ratio of a number of moles of cobalt to a total number of moles of metal other than lithium in the composition is 0.02 or more and 0.33 or less.

5. The method according to claim 1, wherein the lithium transition metal composite oxide particle has a composition comprising manganese, and wherein a ratio of a number of moles of manganese to a total number of moles of metal other than lithium in the composition is 0.01 or more and 0.33 or less.

6. The method according to claim 1, wherein an oxide containing lithium and aluminum adhering to a surface of the lithium transition metal composite oxide particle after the heat treatment has a volume-based particle diameter distribution in which the oxide containing lithium and aluminum has a total volume percentage of particles having a particle diameter of 0.4 μm to 3.0 μm is greater than 50%.

7. The method according to claim 1, wherein a volume average particle diameter of the lithium transition metal composite oxide particle is 2 μm to 25 μm.

8. The method according to claim 6, wherein a volume average particle diameter of the lithium transition metal composite oxide particle is 2 μm to 25 μm.

9. The method according to claim 1, wherein a mixing ratio of a number of moles of lithium in the lithium compound to the lithium transition metal composite oxide in the mixture is 1.2% to 7.4%.

10. The method according to claim 1, wherein a mixing ratio of a number of moles of aluminum in the aluminum compound to a number of moles of the lithium transition metal composite oxide in the mixture is 0.4% to 1.2%.

11. The method according to claim 1, wherein a mixing ratio of a number of moles of boron in the boron compound to a number of moles of the lithium transition metal composite oxide in the mixture is 0.3% to 2%.

12. The method according to claim 1, wherein the aluminum compound has a volume average particle diameter of 1.1 μm or greater.

* * * * *